United States Patent Office 3,134,203
Patented May 26, 1964

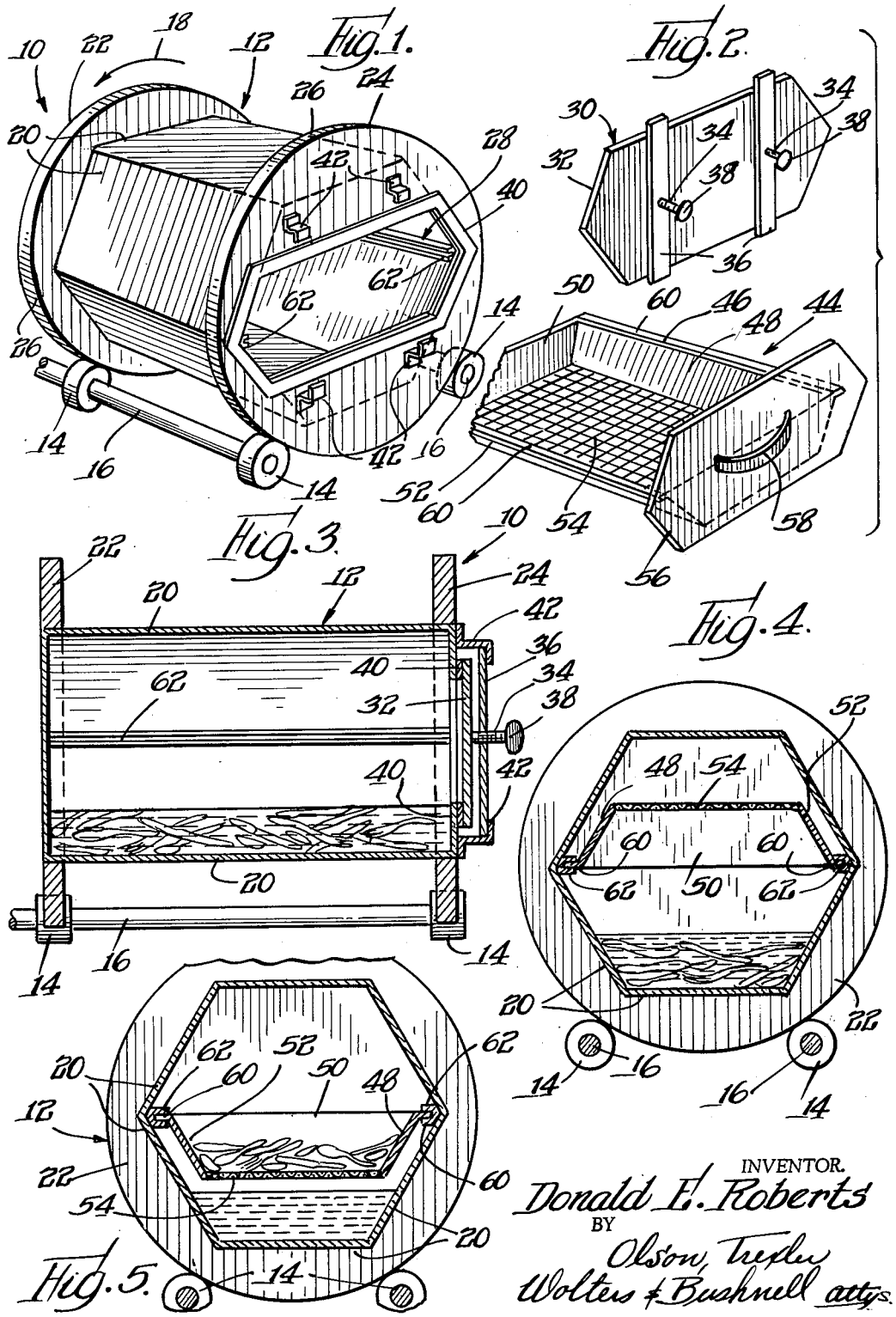

3,134,203
TUMBLING APPARATUS
Donald E. Roberts, Bellwood, Ill., assignor to Silver Service Corporation, Bellwood, Ill., a corporation of Delaware
Filed Aug. 8, 1962, Ser. No. 215,577
9 Claims. (Cl. 51—164)

This invention relates generally to tumbling apparatus for use in cleaning, abrading, burnishing, plating and analogous processes, the invention relating more particularly to the means for unloading such apparatus.

Machines for cleaning and abrading various articles in a tumbling operation have, in the past, commonly comprised a horizontal drum supported in trunnions for rotation, the drum being provided with a closable port in one of its sides for loading and unloading both the articles to be tumbled and any tumbling medium to be employed. Such laterally ported tumbling drums are rather generally utilized even though they have numerous disadvantages. The laterally ported drums heretofore used have required either dumping of the entire contents for unloading the articles which have been tumbled or manual separation of the articles from the tumbling medium in the drum. Both of these procedures have proved to be a safety hazard because of possible bodily contact by the operator with the strong solutions frequently filled into the barrel. A further disadvantage of the laterally ported drum arrangements resides in the necessity, after dumping the drum contents, of sorting the workpieces to separate them from the tumbling medium. Moreover, the prior art tumbling machines have rather generally required extensive auxiliary equipment including supports, screens, trays and cranes.

Therefore, a general object of the present invention is to provide tumbling apparatus which includes a novel unloading arrangement.

A more general object of the invention is to provide new and improved tumbling apparatus.

Another object of the invention is to provide tumbling apparatus including an unloading arrangement that is adapted to separate the workpieces from the tumbling medium.

Still another object of the invention is to provide tumbling apparatus that is safe and easy to operate.

Yet another object of the invention is to provide tumbling apparatus embodied as a compact, self-contained unit.

A further object of the invention is to provide tumbling apparatus arranged for complete unloading of the work which has been previously sorted from the tumbling medium.

These and other objects and features of the invention will become more apparent upon a reading of the following descriptions.

Apparatus in accord with the invention comprises a barrel supported for rotation about its longitudinal axis, including an end having a port opening from the center thereof and extending to positions adjacent the opposite sides of the barrel; drive means for rotating the barrel; and a tray withdrawably receivable in the barrel through the port, the tray including a fenestrated member extending between opposite side portions of the barrel and between the opposite ends of the barrel to capture articles being tumbled in the barrel for unloading the same.

The invention, both to its structure and mode of operation, will be better understood by reference to the following disclosure and drawing forming a part thereof, wherein:

FIG. 1 is a perspective view of tumbling apparatus constructed in accordance with the principles of the present invention and shown with the unloading port in open condition;

FIG. 2 is a perspective view of the closure panel and the tray unit used alternatively in closing the port formed in the apparatus of FIG. 1;

FIG. 3 is a side elevational view in central cross-section showing the apparatus of FIG. 1 with the closure panel secured in place for use of the apparatus in the actual tumbling operation;

FIG. 4 is an end elevational view taken in central cross-section showing the tray unit disposed in place ready for sorting of the workpieces from the tumbling medium; and FIG. 5 is a view similar to the showing of FIG. 4 but illustrating the apparatus rotated a half turn to capture the articles being tumbled in the barrel for unloading the same.

Referring now in detail to the drawing, specifically to FIG. 1, tumbling apparatus indicated generally by the numeral 10 is seen to include a barrel 12 supported in substantially horizontal disposition on rollers 14. The four rollers 14 upon which the barrel 12 is supported are mounted in pairs on parallel shafts 16; and the shafts 16 are coupled to motive means, not shown, for rotating the shafts 16 so as to drive the barrel 12 in a suitable direction such as that indicated by arrow 18.

The barrel 12 comprises side panels 20 which completely close the lateral portions of the barrel, the barrel further comprising end members 22 and 24; and it is to be noted that the end members 22 and 24 extend radially beyond the panels 20 to define wheel edges 26 that contact the rollers 14 laterally of the barrel proper. Although the side panels 20 and the end members 22 and 24 are shown as imperforate elements, fabricated for example from hard rubber or wood, the barrel could as well be made from elements perforated with holes small enough to pass liquid readily but large enough to retain both a tumbling medium such as metal shot or rings and articles to be worked upon. Furthermore, the six flat side panels 20 which are shown to be arranged in hexahedral fashion may be replaced by other numbers of panels or by panels provided with a curvature.

The important consideration with respect to the construction of barrel 12 and its cooperation with the drive elements is that the end member 24 be free or void of drive mechanisms or other appurtenances in order to permit the fashioning of end member 24 with an unloading port 28. As is well shown in FIG. 1, the port 28 opens from the center of end member 24 and extends to positions adjacent the opposite sides of the barrel, i.e. to substantially the inside diametrical extremes of the barrel. Moreover, the port 28 is comparatively shallow, being spaced apart from the edges of those side panels 20 which are transversely disposed relative to the elongated or diametrical extent of the port. The purposes of a port of this character will become apparent hereinafter.

Before turning to a detailed consideration of the closure panel, the tray unit and the cooperation of these elements with the unloading port 28, it is important to describe an alternate drive arrangment for the drum 12. Specifically, it is recognized that the drum or barrel 12 may be mounted on and driven by a tilting arbor instead of the rollers 14 and the shafts 16. Such an arrangement eliminates the need for a closure panel during the tumbling operation because the rotation of the barrel is performed with the barrel tilted so that end member 24 is raised at an angle relative to the end member 22. Thus, the contents of the barrel are prevented from spilling out during rotation of the barrel even though the port 28 is allowed to remain open. Advantageously, the barrel is directed into a horizontal aspect at appropriate times during the unloading operation.

Returning to the illustrated embodiment and particularly to a consideration of the structures disclosed in FIG. 2, a closure panel 30 is seen to comprise a flat imperforate member 32 of somewhat greater area than the port 28. To the member 32, a pair of screws 34 are rotatably attached; and blades 36 threadedly engage the screws 34 beneath the winged heads 38 thereof. As will be seen in FIGS. 1 and 3, the front face of end member 24 is provided with a resilient strip 40 surrounding the margins of port 28 and with a suitable number of brackets 42 secured to the end member on opposite sides of the port.

FIG. 2 also shows a tray unit 44 which is used in unloading the workpieces charged into the barrel 12, the tray unit 44 including a fenestrated member 46 of trough-like shape. The member 46 specifically comprises, according to the illustrated embodiment, imperforate sides 48, 50 and 52 and a wire mesh bottom 54. The openings or meshes in bottom 54 are selected to pass the pieces of a particulate tumbling medium and to retain larger sized workpieces; and various degrees of perforation have been arranged to sort various sized workpieces from various mediums. A panel 56 closes off the end of member 46 opposite the side 50, and panel 56 is selected to be of a size and shape similar to member 32 of the closure panel 30. Advantageously, a handle element 58 is secured to the front face of panel 56 for facility in manually manipulating the tray unit 44.

When the tray unit 44 is disposed within the barrel 12 by being passed through the port 28, the fenestrated member 46 resides substantially on one side of a central plane bisecting the barrel. In addition, the sides 48 and 52 extend between opposite side portions of the barrel and are arranged to prevent passage of the workpieces from one side of the central plane to the other. For this latter purpose and for the purpose of facilitating insertion and withdrawal of the tray unit 44, the sides 48 and 52 are provided with outwardly extending flanges or lips 60 which define runners. These runners are arranged to operate in tracks 62 mounted on opposite interior sides of the barrel 12 as is shown in FIG. 1. The tracks 62 and the runners 60 may extend the entire length of the barrel 12 or only a portion thereof. Moreover, suitable track-and-runner means may be defined by the spaced upper edges of the panels 48 and 52 cooperating or mating with the intersecting panels 20. In addition, rails or guides may be provided exteriorly of the barrel 12 to coact with appropriately positioned runners extending from the panel 56. As will be recognized, the side 50 and the panel 56 are spaced to extend between the opposite ends of the barrel, i.e. between the end members 22 and 24, in a fitting relationship whereby to insure capturing all of the workpieces charged into the barrel upon unloading and whereby to prevent accidental discharge of the remainder of the contents of the barrel when the tray unit 44 is disposed therein.

Having thus described one construction of the invention, it is important now to state how the illustrated embodiment operates.

First, a suitable quantity of a washing or cleaning liquid will be charged into the barrel 12 through port 28, for example to fill the barrel to the level shown in FIGS. 3 and 5, the port being horizontally disposed for proper filling; and assuming that an appropriate quantity of a suitable tumbling medium such as metal shot, is also charged into the barrel, a quantity of workpieces, i.e. articles to be tumbled, will be dumped into the barrel through the port 28. Thereupon, the closure panel 30 will be fitted over the port 28 with the rear margins of the member 32 engaging the resilient strip 40. To seal the barrel, the screws 34 will be turned by means of the winged heads 38, forcing the blades 36 against the brackets 42 and reacting to urge the member 32 against the strip 40.

After the tumbling operation has been completed, the closure panel 30 will be removed by reversing the above-described procedure. Then the tray unit 44 will be inserted in the barrel 12 through the open port 28, the tray unit being inserted upside down as is illustrated in FIG. 4. Thereafter, the barrel will be rotated a half turn in order to right the tray unit as is shown in FIG. 5. The barrel will next be rocked or vibrated to separate the workpieces from the tumbling medium the tumbling medium and the washing or cleaning liquids passing through the openings in the mesh bottom 54 of the tray unit. It is to be noted that the tray unit is spaced apart from the liquid contents in this latter position whereby to enable drainage of the workpieces. Thereafter, the tray unit will be withdrawn from the barrel and the finished workpieces readily dumped.

It is to be recognized that, by use of the present invention, the workpieces are separated from both the liquid contents and the tumbling medium before unloading from the barrel, thus achieving a simple, quick operation in which there is no opportunity for the operator to come in contact with any strong chemicals incorporated in the working liquids. It is also to be recognized that the present invention encourages a complete unloading of the workpieces from the tumbling apparatus. Numerous operating advantages also accrue, such as quick loading and unloading, minimum space requirement, minimum handling of the work and minimum loss of the tumbling medium and the cleaning materials.

While a particular embodiment of the invention has been shown and described in detail, it should be understood, of course, that the invention is not limited thereto since many modifications may be made. For example, it has been suggested hereinabove that the drive rollers 14 may be replaced by a tilting arbor. In addition, while the imperforate barrel which has been disclosed provides a self-contained unit, it has also been suggested hereinabove that the barrel may be made perforate, in which latter case the barrel may be lowered into a treating bath for operation completely submerged. Systems delivering air or other gases and systems spraying various liquids may also be incorporated with the disclosed apparatus without departing from the invention.

Thus, the specific example herein shown and described is to be considered as being primarily illustrative. Various changes in structure may occur to those skilled in the art, and such changes are to be understood as forming a part of this invention insofar as they fall within the spirit and scope of the appended claims.

The invention is claimed as follows:

1. Tumbling apparatus comprising: a barrel supported for rotation about its longitudinal axis, said barrel including an end having a port opening from the center thereof; drive means for rotating said barrel, including a rotatable element drivingly engaging said barrel at a position away from said one end; and tray means withdrawably receivable in said barrel through said port, including a fenestrated member extending between opposite side portions of said barrel and between the opposite ends of said barrel to capture articles being tumbled in said barrel for unloading the same, said tray means further including sides rising from the fenestrated member to form therewith a trough for retaining said articles in collected relationship upon withdrawal of said tray means from said barrel.

2. Tumbling apparatus comprising: a barrel supported in substantially horizontal disposition for rotation about its longitudinal axis, said barrel having ends and sides, one of said ends having a port opening from the center thereof and extending to positions adjacent the opposite sides of said barrel; drive means for rotating said barrel, including a rotatable element drivingly engaging said barrel at a position away from one said end; and tray means withdrawably receivable in said barrel through said port, including a fenestrated member extending between opposite side portions of said barrel and between the opposite ends of said barrel to capture articles being tumbled in said barrel for unloading the same, said tray means further including sides rising from the fenestrated member to form therewith a trough for retaining said articles in collected relationship upon withdrawal of said tray means from said barrel.

3. Tumbling apparatus according to claim 1 wherein said position is a position laterally of said barrel.

4. Tumbling apparatus according to claim 1 wherein the holes in said fenestrated member are selected to pass the pieces of a particulate tumbling medium and to retain larger sized workpieces.

5. Tumbling apparatus comprising: an imperforate barrel supported in substantially horizontal disposition for rotation about its longitudinal axis, said barrel including ends and sides, one of said ends having a port opening from the center thereof and extending to positions adjacent the opposite sides of said barrel; drive means for rotating said barrel, including a rotatable element drivingly engaging said barrel at a position away from said one end; and tray means withdrawably receivable in said barrel through said port, including a fenestrated member extending between opposite side portions of said barrel and between the opposite ends of said barrel to capture articles being tumbled in said barrel for unloading the same, said tray means further including sides rising from the fenestrated member to form therewith a trough for retaining said articles in collected relationship upon withdrawal of said tray means from said barrel, said fenestrated member being spaced apart from the transverse opposite sides of said barrel to facilitate separation of the articles being tumbled and the tumbling material.

6. Tumbling apparatus comprising: a barrel supported for rotation about its longitudinal axis, said barrel including an end having a comparatively shallow port opening from the center thereof and extending to substantially the inside diametrical extremes of said barrel; drive means for rotating said barrel, including a rotatable element drivingly engaging said barrel at a position away from said one end; and tray means withdrawably receivable in said barrel through said port, including a fenestrated member extending between opposite side portions of said barrel and between the opposite ends of said barrel to capture articles being tumbled in said barrel for unloading the same, said tray means further including sides rising from the fenestrated member to form therewith a trough for retaining said articles in collected relationship upon withdrawal of said tray means from said barrel.

7. Tumbling apparatus comprising: a barrel supported in substantially horizontal disposition for rotation about its longitudinal axis, said barrel including ends and sides, one of said ends having a port opening from the center thereof and extending to substantially the inside diametrical extremes of said barrel, said port being spaced from the transverse edges of said one end; drive means for rotating said barrel, including a rotatable element drivingly engaging said barrel at a position away from said one end; and tray means withdrawably receivable in said barrel through said port, including a fenestrated member extending between opposite side portions of said barrel and between the opposite ends of said barrel to capture articles being tumbled in said barrel for unloading the same, said tray means further including sides rising from the fenestrated member to form therewith a trough for retaining said articles in collected relationship upon withdrawal of said tray means from said barrel.

8. Tumbling apparatus comprising: a barrel supported for rotation about its longitudinal axis, said barrel including an end having a port opening from the center thereof and extending to positions adjacent the opposite sides of said barrel; drive means for rotating said barrel, including a rotatable element drivingly engaging said barrel at a position away from said one end; tray means withdrawably receivable in said barrel through said port, including a fenestrated member extending between opposite side portions of said barrel and between the opposite ends of said barrel to capture articles being tumbled in said barrel for unloading the same; and track-and-runner means acting between said tray means and said opposite side portions of said barrel to guide the movements of said tray means relative to said barrel, said tray means further including sides rising from the fenestrated member to form therewith a trough for retaining said articles in collected relationship upon withdrawal of said tray means from said barrel.

9. Tumbling apparatus according to claim 1 wherein said tray means is arranged for disposition of said fenestrated member wholly on one side of a diametrical plane passing through said barrel.

References Cited in the file of this patent

UNITED STATES PATENTS

| | | |
|---|---|---|
| 1,247,079 | Casey | Nov. 20, 1917 |
| 1,959,546 | Power | May 22, 1934 |
| 2,191,891 | Levitetz | Feb. 27, 1940 |
| 2,197,100 | Downes | Apr. 16, 1940 |
| 2,344,135 | Downes | Mar. 14, 1944 |

FOREIGN PATENTS

| | | |
|---|---|---|
| 869,791 | Germany | Mar. 9, 1953 |